(12) United States Patent
Birk et al.

(10) Patent No.: US 7,755,473 B2
(45) Date of Patent: Jul. 13, 2010

(54) ACTIVE SAFETY SYSTEM FOR A VEHICLE AND A METHOD FOR OPERATION IN AN ACTIVE SAFETY SYSTEM

(75) Inventors: Wolfgang Birk, Gammelstad (SE); Mattias Erik Brannstrom, Göteborg (SE); Daniel Levin, Göteborg (SE); Andreas Eidehall, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 11/851,678

(22) Filed: Sep. 7, 2007

(65) Prior Publication Data
US 2008/0061958 A1   Mar. 13, 2008

(30) Foreign Application Priority Data
Sep. 8, 2006 (EP) .................... 06120350

(51) Int. Cl.
*B60Q 1/00* (2006.01)
(52) U.S. Cl. ............... 340/435; 340/436; 340/575; 701/301

(58) Field of Classification Search .......... 340/576, 340/575, 435, 436, 539.25, 521, 517; 382/103; 701/301; 348/77; 180/273–275
See application file for complete search history.

(56) References Cited

U.S. PATENT DOCUMENTS

| | | | |
|---|---|---|---|
| 6,496,117 B2 * | 12/2002 | Gutta et al. | 340/576 |
| 6,989,754 B2 * | 1/2006 | Kisacanin et al. | 340/576 |
| 7,034,668 B2 | 4/2006 | Engelman et al. | |
| 7,209,833 B2 * | 4/2007 | Isaji et al. | 701/301 |
| 2004/0150514 A1 | 8/2004 | Newman et al. | |
| 2005/0159893 A1 | 7/2005 | Isaji et al. | |
| 2006/0077050 A1 | 4/2006 | Takahashi | |

FOREIGN PATENT DOCUMENTS
WO   WO 2004/034905   4/2004

* cited by examiner

*Primary Examiner*—Anh V La
(74) *Attorney, Agent, or Firm*—Frank A. MacKenzie; Brooks Kushman P.C.

(57) ABSTRACT

An active safety system for a vehicle includes an external object sensor system arranged on a host vehicle. The sensor system designed to sense objects external to the host vehicle and generate input data relating to the objects, wherein the input data includes an object position ($(R, \psi_{rel})(t)$). Additionally, a threat indicator is included to assign a threat level ($T_k(t)$) to each external object (k) detected by the sensor system.

14 Claims, 3 Drawing Sheets

$$B = \begin{matrix} \text{Time} \\ \begin{array}{c} t_0 \\ t_1 \\ t_2 \\ t_3 \\ t_4 \\ t_5 \\ \vdots \\ \downarrow \end{array} \end{matrix} \begin{matrix} \text{Object} \longrightarrow \\ \begin{array}{cccc} O1 & O2 & O3 & O4 \quad \cdots \\ \left[ \begin{array}{cccc} 0 & 0,1 & 0 & \cdots \\ 0 & 0,3 & \cdots & \cdots \\ 0,5 & \cdots & \cdots & \cdots \\ 0,3 & \cdots & \cdots & \cdots \\ 0 & \cdots & \cdots & \cdots \\ 0 & \cdots & \cdots & \cdots \\ \vdots & & & \end{array} \right] \end{array} \end{matrix}$$

*Fig-5*

ACTIVE SAFETY SYSTEM FOR A VEHICLE AND A METHOD FOR OPERATION IN AN ACTIVE SAFETY SYSTEM

TECHNICAL FIELD

The present invention relates to an active safety system for a vehicle. In particular, the present invention relates to an active safety system for a vehicle including a threat level indicator. The invention furthermore relates to a method for operation in an active safety system. In particular, the invention relates to a method for operation in an active safety system for a vehicle, where a threat level is assigned to each object detected by a sensor system arranged on a host vehicle.

BACKGROUND ART

In order to increase safety in traffic, active as well as passive systems for further improving safety in traffic are continuously developed. Passive safety systems are directed toward reducing the effect of an accident, in the event an accident takes place, while active safety systems are directed toward reducing the probability of occurrence of accidents.

Active safety systems which include a threat level indicator, which assigns a threat level to each object detected by a sensor system arranged on a host vehicle are previously known. As an example, U.S. Pat. No. 7,034,668 relates to a threat level identification and quantifying system. The system assigns a threat level to each detected object. When the treat level exceeds a threshold value, active or passive countermeasures, such as breaking, steering or generation of warning signs, may be generated.

Even though active safety systems which assigns a threat level to each object detected by a sensor system arranged on a host vehicle are known, there still is a need for improvements of the systems, in particular when it concerns how to use the assigned threat level of objects in order to further increase the safety for the users of the systems as well as for others being involved in complex traffic situations.

SUMMARY OF THE INVENTION

The object of the invention is to provide a system and a method for further increasing the safety of a host vehicle and other objects being in a complex traffic situation by an appropriate use of an active safety system, which includes a threat level indicator. The object is achieved by an active safety system according to claim 1.

The system according to claim 1 includes
an eye gaze recorder arranged for, recording the direction of gaze of a user, determined by an eye gaze monitor;
an awareness detector which is arranged to determine awareness of an object based on an assessed observation, which observation is being assessed by use of a recorded direction of gaze of the user and said object position; and
a controller which is arranged to, for objects detected by said sensor system and objects which the user is aware of, collect threat level data from said threat indicator, to store threat level data collected at different points in time, to assign a threat level awareness by selecting the threat level at which the object was observed, and to compare the current threat level of the object with the threat level at which the object was observed. The threat level awareness is thus constituted by the threat level of an object at the time the user observed the object.

According to the invention a controller keeps track of which objects a user is aware of, what threat level the object has at the point in time when the user observed the object and how the treat level is changed since the user observed the object.

A problem related to active safety systems that intervenes the driver, either only via sending an alarm signal to the driver, or via intervention in the command over the vehicle, is that any unnecessary intervention by the active safety system reduces the driving comfort and may become annoying to the driver. A driver may find a vehicle equipped with such a system unreliable. A further problem related to active safety systems is to decide when to intervene. If intervention is made early, intervention may be made by use of small corrections as regards braking effect or yaw angle correction. However, for early interventions predictions of the paths of external objects must be performed for a longer period of time, which decreases the accuracy of the path predictions. One reason for the decreased accuracy is that the objects or the host vehicle may perform more voluntary corrections under a longer period than a shorter, which corrections may not be accounted for in the path prediction. Early intervention may therefore lead to unnecessary or incorrect intervention. If intervention is made at a late stage, intervention must be made by use of large forces, in the event intervention in the command over the vehicle is performed. On the other hand, if an alarm signal is sent to the driver, correction must be made by the driver by use of large forces. Finally the intervention may be made too late such that it is no longer possible to avoid a particular situation.

Since drivers are constantly adapting to a traffic situation by assessing the situation for following the road, avoiding objects and selecting appropriate speed by accelerating or braking, information about which objects the driver are aware of is of a great importance for determining how an active safety system should intervene. Generally intervention by active safety systems is far more accepted by drivers when intervention concerns avoiding objects and situations that the driver was not aware of. For this reason intervention can be allowed at an early stage for objects that the driver was not aware of, while intervention can be made at a late stage for objects that the driver was aware of.

Awareness of an object may be determined by first locating the object by an external object sensor system arranged on a host vehicle. The sensor system determines a direction toward the object. An eye gaze monitor determines the direction of gaze of the driver of the host vehicle. A comparator determines that the driver observes the object if the direction of the gaze of the driver corresponds to the direction toward the object. When having observed the object the driver will be assumed to be aware of the object for a period of time from the time of observation.

The system according to the invention enables adaptation of the countermeasures depending on not only if the user is aware of an object or not, but also depending on how the threat level has changed since the user observed the object. It is thus possible to perform certain actions if the threat level has increased since the last operations, such as to reschedule interventions to take place earlier. On the other hand if the threat level has decreased, it is possible to also adapt to this situation by possibly delaying any intervention further.

In a particularly preferred embodiment, controller is arranged to generate a control signal, preferably in the form of a warning sign to the driver, in the event, for any of the objects detected by the sensor system and which objects the driver is aware of, the current threat level exceeds the threat level awareness by more than a threshold value. In this system, the driver is assumed to master the traffic situation for all objects that the driver is aware of, by having assessed the threat level of the objects observed and thereby adapting to the situation. In the event the treat level for some of the objects increases since the observation was made, the driver have not had any possibility of detecting the increased threat. The system will warn the driver, such that the driver may become aware of the new increased threat level for the object such that the driver may adapt to the situation.

By keeping track of which object the driver is aware of, the system may be adapted to not unnecessarily interfere with the driver. By keeping track of how the threat level changes for objects which the driver is aware of, the system may be even better adapted to perform more suitable countermeasures.

Since the threat level is continuously updated, the threat level of a specific object will vary. In order not to generate to frequent control signals, a control signal is generated in the event, for any of the objects detected by the sensor system and which objects the driver is aware of, the current threat level exceeds the threat level awareness by more than a threshold value. The threshold value may be variable and depend on the time interval between the time of observation and the current time, or the derivative of the threat level Preferably the awareness detector is arranged to determine that a user is no longer aware of an object if the time span since the user observed the object exceeds an awareness time threshold value. The awareness time threshold value may depend on the velocity of the host vehicle.

The invention further relates to a method for operation in an active safety system, which provides the advantages of the system described above.

BRIEF DESCRIPTION OF DRAWINGS

The invention will be described in further detail together with references to appended drawings where

FIG. 5 shows a matrix in which the threat levels for each external object are stored.

SPECIFICATION

Figure 1:
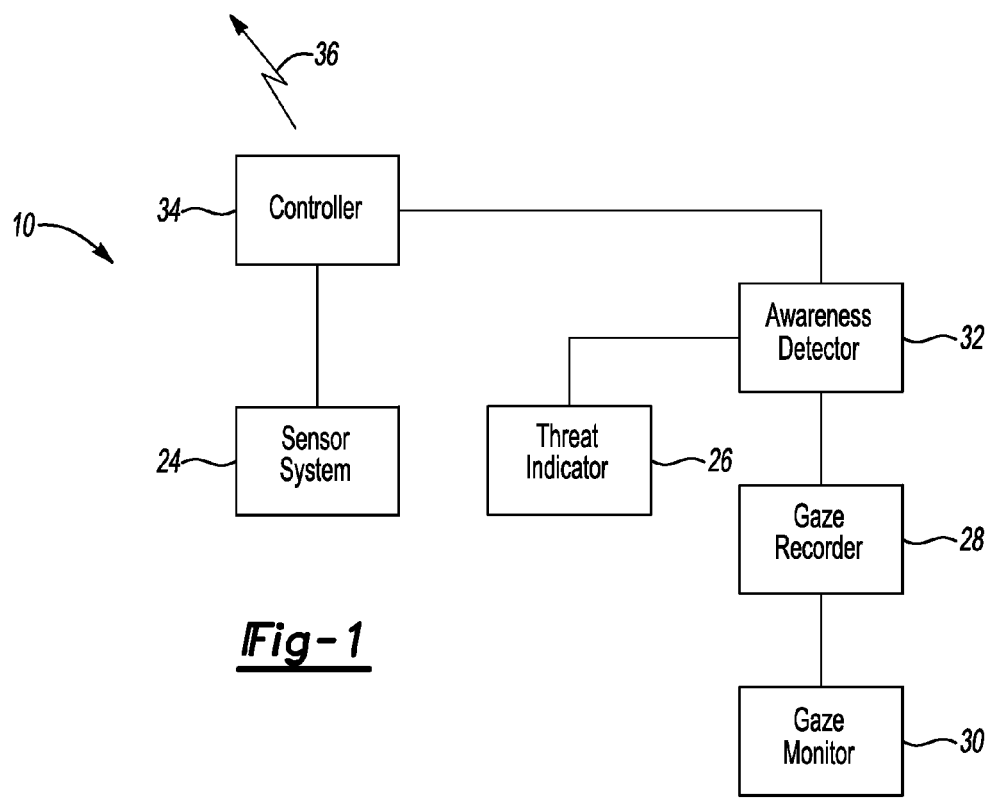
FIG. 1 is a block scheme of an object active safety system according to the invention.
Figure 2:
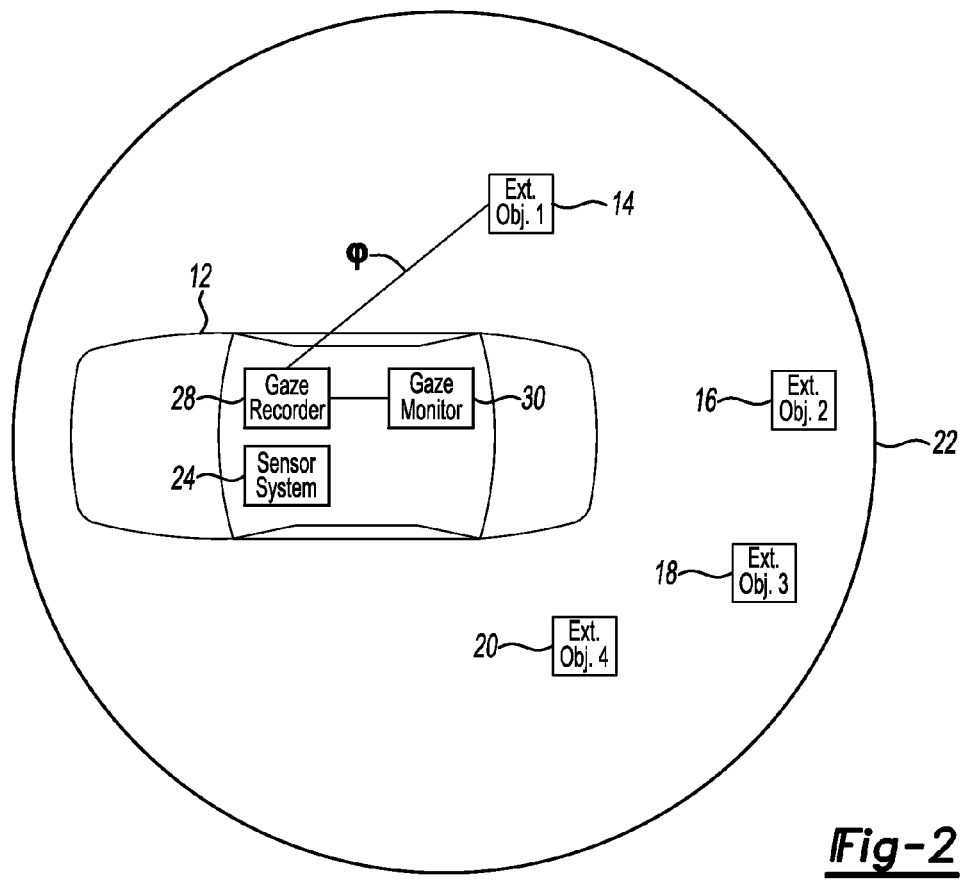
FIG. 2 shows a traffic situation including a host vehicle and a set of external objects.

An embodiment of the invention will be described in further detail with references to FIGS. 1 and 2, where FIG. 1 shows an embodiment of an active safety system 10 according to the invention and FIG. 2 shows a traffic situation including a host vehicle 12 and a set of external objects 14-20 being inside a detecting range 22 of a sensor system 24 arranged on the host vehicle 12.

The sensor system 24, included in the active safety system 10, is arranged to, within the detecting range 22, sense objects and generate input data relating to objects external to said host vehicle, wherein said input data at least include an object position (R, $\psi_{rel}$). Here R indicates the distance to the object and $\psi_{rel}$ indicates the angle relative to the vehicle. Suitable sensor systems are well known in the art. An example of a suitable system is sold under the trade name Mobile Eye.

The active safety system 10 furthermore includes a threat indicator 26 which is arranged to assign a threat level to each external object detected by the sensor system 24. Threat indicators are well known in the art. An example of a threat indicator is described in U.S. Pat. No. 7,034,668. A thorough description of how to enable a threat level indicator is described in "Collision avoidance theory", Jansson J., Linköping Studies in Science and technology, Dissertation no 950, Linköping 2005. In particular chapters 5.3.6-5.3.8 relates to equations describing required longitudinal acceleration and required lateral acceleration for collision avoidance, which entities suitably may be used as threat level, particularly if these entities have been normalized by dividing with maximum available longitudinal acceleration and lateral acceleration respectively.

An eye gaze recorder 28, included in the active safety system 10, is arranged for recording the direction of gaze of a user $\phi$ determined by an eye gaze monitor 30. Eye gaze monitors are well known in the art. A camera registers characteristic features of the users head, suitably the eyes. The eye gaze monitor determines, via image recognition the direction of the gaze $\phi$ relative to the vehicle. In the eye gaze recorder 28 the direction of gaze determined by the eye gaze monitor 30 are stored in a memory.

An awareness detector 32 is arranged to determine awareness of an object based on an assessed observation. An observation is assessed by use of a recorded direction of gaze $\phi$ of the user and the position of the detected objects (R, $\psi_{rel})_{object-k}$. An observation of an object k is assessed when the direction of the gaze $\phi$ corresponds to the direction to an object k $\psi_{relobject-k}$ at a given time $t_{k0}$. "Corresponds to" is here intended to mean that the difference between the direction of gaze $\phi$ and the direction to an object k $\psi_{relobject-k}$ is smaller than a predetermined angle, suitably 2°.

A controller 34 is arranged to, for objects detected by said sensor system 24 and objects which the awareness detector 32 has determined that the user is aware of, collect threat level data $T_k(t)$ from the threat indicator 26, to store threat level data $T_k(t)$ collected at different points in time, to assign a threat level awareness ($T_k(t_{k0})$) by selecting the threat level ($T_k(t)$) at which the object (k) was observed, and to compare the current threat level ($T_k(t)$) of the object with the threat level awareness ($T_k(t_{k0})$).

In a method according to the invention, the following process steps may be performed:

In a set of process steps S10, within a detecting range 22 of a sensor system 24 arranged on a host vehicle 12, sensing objects 14-20 external to the host vehicle. Input data relating to objects external to said host vehicle is generated. The input data include an object position (R, $\psi_{rel}$). The input data may be processed in a state observer based on a Kalman filter process as is conventional in the art. A conventional observer $X_k$ suitably includes the states $x_n$; $y_n$; $\beta_n$; $a_n$; and $v_n$, where $x_n$ is a coordinate along the length of the road for object number k; $y_n$ is a coordinate in the width direction of the road for object number k; $\beta_n$ is an angle between the travelling direction and the coordinate length extension of the road for object number k; $a_n$ is the acceleration for object number k; and $v_n$ is the velocity of object k, such that the observer $X_k$ may be expressed as $X_k=[x_n\ y_n\ \beta_n\ a_n\ v_n]$. for an external object k. The input data may also include host vehicle measurement data such as host vehicle velocity $V_H$, acceleration $a_H$, host vehicle yaw angle $\theta_H$. A suitable observer for the host vehicle may be $Y_H=[x_H\ y_H\ \beta_H]$, where $x_H$ is a coordinate along the length of the road for the host vehicle; $y_H$ is a coordinate in the width direction of the road for the host vehicle; $\beta_H$ is an angle between the travelling direction and the coordinate length extension of the road for the host vehicle.

In a set of process steps S20, recording the direction of gaze $\phi$ of a user, determined by an eye gaze monitor 30.

Figures 3, 4:
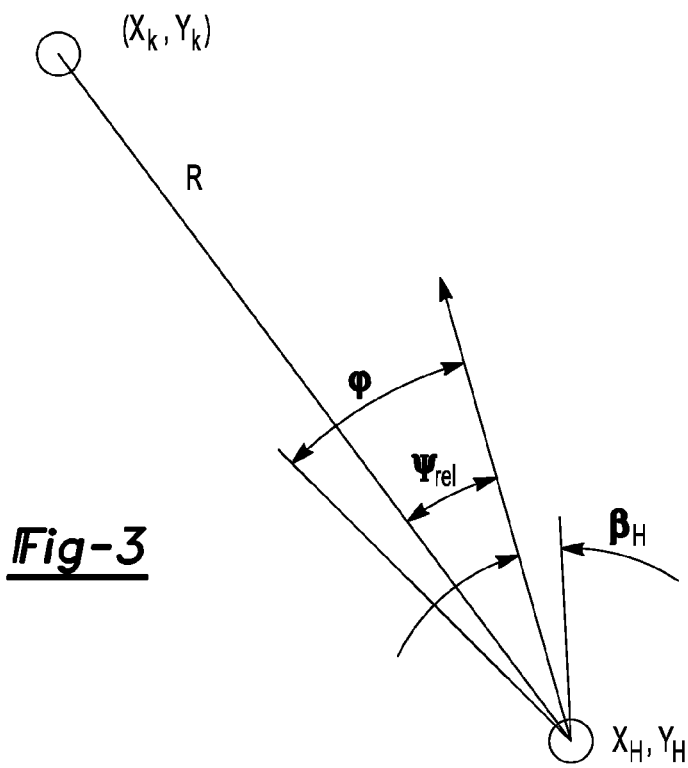
FIG. 3 illustrates the geometry of a situation including an host vehicle and an external object.
FIG. 4 show a matrix storing awareness of external objects.

In a set of process steps S30, determining awareness of an object based on an assessed observation, which observation is being assessed by use of a recorded direction of gaze φ(t) of the user and the position of the objects (R, $\psi_{rel}$). In FIG. 3 the relation between the coordinates of the host vehicle ($x_H$, $y_H$), the coordinates of an object ($x_k$, $y_k$), the distance to the object R and the angle $\psi_{rel}$ between a heading direction of the vehicle and the object k is shown. The awareness detector determines that the driver is aware of an object k if the direction of gaze φ(t) at a time t and the angle $\psi_{rel}$(t) between a heading direction of the vehicle and the object k is within a predetermined narrow sector, preferably abs(φ(t)−$\psi_{rel}$(t))<2°. The awareness detector may determine that the driver is no longer aware of an object if to long time of to long travelling distance has lapsed since the last observation of the object.

The observations of external object may suitably be stored in a matrix $B_k$(t) as exemplified in FIG. 4. In the matrix 1 denotes that the driver is aware of the object and 0 that the driver is not aware of the object. When a certain time or travelling distance has passed since the observation, an assumption of that the driver is no longer aware of the object is made. The awareness detector may thus be arranged to determine that a user is no longer aware of an object if the time span Δ since the user observed the object exceeds an awareness time threshold value. The awareness time threshold value $S_{time}$ may depend on the velocity of the host vehicle.

In a set of process steps S40 a threat level $T_k$ is assigned to each external object detected by the sensor system. The threat levels $T_k$(t) for each external object k is suitably stored in a matrix T as exemplified in FIG. 5. Preferably a relative threat number between 0 and 1 is used, where 1 means that a collision between the external object and the host vehicle can not be avoided.

At least for objects detected by said sensor system and objects which the user is aware of, the following set of process steps S60 are performed: collecting threat level data from said threat indicator, storing threat level data collected at different points in time, assigning a threat level awareness by selecting the threat level at a time $t_{kO}$ at which the object was observed, and comparing the current threat level $T_k$(t) of the object k with the threat level awareness $T_k(t_{kO})$, which corresponds to the threat level at the time $t_{kO}$ when the object k was observed.

The controller preferably generates a control signal 36 in the event, for any of the objects detected by the sensor system, the current threat level $T_k$(t) exceeds the threat level awareness $T_k(t_{kO})$ by more than a threshold value S.

The threshold value may depend on the derivative of the threat level or on the time interval between the time of observation and the current time.

The control signal 36 is preferably constituted by a warning transmitted visually to the driver.

The invention claimed is:

1. An active safety system for a vehicle comprising:
   an external object sensor system arranged on a host vehicle, the sensor system being arranged to, within a detecting range of the sensor system, sense objects (k) external to the host vehicle and generate input data relating to the objects (k), wherein the input data includes an object position ((R, $\psi_{rel}$)(t)),
   a threat indicator arranged to assign a threat level ($T_k$(t)) to each external object (k) detected by the sensor system; characterised in that the active safety system further includes:
   an eye gaze recorder arranged for recording the direction of gaze (φ(t)) of a user, determined by an eye gaze monitor;
   an awareness detector arranged to determine awareness ($A_k$(t)) of an object (k) based on an assessed observation, which observation is being assessed by use of a recorded direction of gaze (φ(t)) of the user and the object position ((R, $\psi_{rel}$)(t)); and
   a controller arranged to, for objects (k) detected by the sensor system and objects which the user is aware of (($A_k$(t))=1), collect threat level data ($T_k$(t)) from the threat indicator, to store threat level data ($T_k$(t)) collected at different points in time, to assign a threat level awareness ($T_k(t_{kO})$) by selecting the threat level ($T_k$(t)) at a time at which the object (k) was observed ($t_{kO}$), and to compare a current threat level ($T_k$(t)) of the object (k) with the threat level awareness ($T_k(t_{kO})$).

2. An active safety system according to claim 1, characterised in that the controller is arranged to generate a control signal in the event, for any of the objects (k) detected by the sensor system, the current threat level ($T_k$(t)) exceeds the threat level awareness ($T_k(t_{kO})$) by more than a threshold value (S).

3. An active safety system according to claim 2, characterised in that the threshold value (S) depends on a time interval between the time of observation ($t_{kO}$) and a current time (t).

4. An active safety system according to claim 2, characterised in that the threshold value (S) depends on the derivative of the threat level ($T_k$(t)).

5. An active safety system according to claim 2, characterised in that the control signal comprises a warning to the user.

6. An active safety system according to claim 1, characterised in that the awareness detector is further arranged to determine that the user is no longer aware of an object if a time span since the user observed the object exceeds an awareness time threshold value ($s_{time}$).

7. An active safety system according to claim 6, characterised in that the awareness time threshold value ($S_{time}$) depends on a velocity of the host vehicle.

8. A method operated in an active safety system for a vehicle comprising the following process steps:
   within a detecting range of a sensor system arranged on a host vehicle, sensing objects (k) and generating input data relating to objects external to the host vehicle, wherein the input data include an object position ((R, $\psi_{rel}$)(t)),
   recording the direction of gaze (φ(t)) of a user, determined by an eye gaze monitor,
   determining awareness ($A_k$(t)) of an object (k) based on an assessed observation, which observation is being assessed by use of a recorded direction of gaze (φ(t)) of the user and the object position;
   assigning a threat level ($T_k$(t)) to each external object (k) detected by the sensor system; characterised in that the following further process steps are performed:
   for objects detected by the sensor system and objects which the user is aware of, collecting threat level data ($T_k$(t)) from a threat indicator, storing threat level data ($T_k$(t)) collected at different points in time, assigning a threat level awareness ($T_k(t_{kO})$) by selecting the threat level ($T_k$(t)) at a time at which the object was observed ($t_{kO}$), and comparing a current threat level ($T_k$(t)) of the object (k) with the threat level awareness ($T_k(t_{kO})$).

9. A method according to claim 8, further comprising generating a control signal in the event, for any of the objects detected by the sensor system, the current threat level ($T_k$(t)) exceeds the threat level awareness ($T_k(t_{kO})$) by more than a threshold value (S).

10. A method according to claim 9, characterised in that the threshold value (S) depends on a time interval between the time of observation ($t_{kO}$) and a current time (t).

11. A method according to claim 9, characterised in that the threshold value (S) depends on derivative of the threat level.

12. A method according to claim 8, characterised in that the user is considered to be no longer aware of an object if a time span since the user observed the object exceeds an awareness time threshold value ($s_{time}$).

13. A method according to claim 12, characterised in that the awareness time threshold value ($S_{time}$) depends on a velocity of the host vehicle.

14. A method according to claim 9, characterised in that the control signal comprises a warning to the user.

* * * * *